United States Patent
Kim

(10) Patent No.: US 8,819,480 B2
(45) Date of Patent: Aug. 26, 2014

(54) DISPLAY APPARATUS AND METHOD FOR UPDATING MICOM CODE THEREOF

(75) Inventor: In-beom Kim, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 333 days.

(21) Appl. No.: 13/181,894

(22) Filed: Jul. 13, 2011

(65) Prior Publication Data

US 2012/0124417 A1    May 17, 2012

(30) Foreign Application Priority Data

Nov. 11, 2010  (KR) .................. 10-2010-0112069

(51) Int. Cl.
  *G06F 11/00*    (2006.01)
(52) U.S. Cl.
  USPC ...................................... 714/6.12
(58) Field of Classification Search
  None
  See application file for complete search history.

(56) References Cited

U.S. PATENT DOCUMENTS

| | | | | |
|---|---|---|---|---|
| 6,205,513 B1* | 3/2001 | Godicke et al. | ............... | 711/103 |
| 6,880,048 B1* | 4/2005 | Lemke | ........... | 711/154 |
| 7,409,539 B2* | 8/2008 | Arnez et al. | .................. | 713/100 |
| 7,444,543 B2* | 10/2008 | Babudri et al. | ............. | 714/6.32 |
| 2006/0075395 A1* | 4/2006 | Lee et al. | ........................ | 717/168 |
| 2006/0225067 A1* | 10/2006 | Yang | ............................. | 717/168 |
| 2007/0113067 A1* | 5/2007 | Oh et al. | ............................ | 713/2 |
| 2008/0086631 A1* | 4/2008 | Chow et al. | ........................ | 713/2 |
| 2010/0185845 A1* | 7/2010 | Takayama et al. | ................. | 713/2 |
| 2011/0179405 A1* | 7/2011 | Dicks et al. | ................... | 717/168 |
| 2011/0320794 A1* | 12/2011 | Yang et al. | ........................ | 713/1 |
| 2013/0174042 A1* | 7/2013 | Kim et al. | ..................... | 715/735 |

\* cited by examiner

*Primary Examiner* — Christopher McCarthy
(74) *Attorney, Agent, or Firm* — Sughrue Mion, PLLC

(57) ABSTRACT

A display apparatus and a method for updating a micom code thereof are provided. According to the display apparatus, if an error occurs while a CPU is updating a micom code, a micom may drive the CPU using a system code. Accordingly, even if an error occurs in the process of updating the micom code, the display apparatus may be restored automatically without a jig apparatus.

17 Claims, 9 Drawing Sheets

DISPLAY APPARATUS AND METHOD FOR UPDATING MICOM CODE THEREOF

CROSS-REFERENCE TO RELATED APPLICATION

This application claims priority from Korean Patent Application No. 10-2010-0112069, filed in the Korean Intellectual Property Office on Nov. 11, 2010 the disclosure of which is incorporated herein by reference.

BACKGROUND

1. Field

Apparatuses and methods consistent with exemplary embodiments relate to a display apparatus and a method for updating a micom code thereof, and more particularly, to a display apparatus which updates a micom code using a CPU and a method for updating a micom code thereof.

2. Description of the Related Art

As technologies involving a television have been developed, a television may provide various functions. Accordingly, a television comprises a CPU and a micom to perform various processing operations.

If a micom code needs to be upgraded, a CPU receives the micom code and upgrades the micom. However, if an error occurs while a micom is being upgraded, a code cannot be installed in the micom normally and thus, the micom cannot operate normally. In addition, as the micom does not operate normally, the CPU may not perform normally, either.

As such, if an error occurs while a micom code is being updated, a display apparatus stops operating and a user may not able to restore the display apparatus. In addition, if a system stops operating, a separate apparatus called a jig should be used to restore the system.

However, a user wishes to restore a display apparatus easily when an error occurs. Accordingly, a method for restoring a display apparatus easily if an error occurs in the process of updating a micom code is required.

SUMMARY

An aspect of the exemplary embodiments relates to a display apparatus in which a micom drives a CPU using a system code for driving the CPU if an error occurs while the CPU updates a micom code and a method for updating a micom code thereof.

A display apparatus, according to an exemplary embodiment, includes a micom which stores a system code for driving a CPU and a Central Processing Unit (CPU) which receives a micom code and updates the micom code installed in the micom using the received micom code, and wherein, if an error occurs while the CPU updates the micom code, the micom drives the CPU using the system code for driving the CPU.

If the CPU is operated using the system code for driving a CPU of the micom, the CPU may restart updating the micom code.

The micom may include a storage unit which stores the system code for driving a CPU.

The storage unit may include a boot code area which stores the system code for driving a CPU, a flash ROM area which records micom codes for operating a system, and a check area in which a check code indicating whether a code is normally recorded in the flash ROM area is recorded.

The micom may check whether a check code is recorded normally in the check area at a time of rebooting a system and drive a CPU using the system code for driving the CPU if the check code is not recorded normally, and if the CPU is operated using the system code for driving the CPU, the CPU may restart updating the micom code after deleting the check area and the flash ROM area.

The micom and the CPU may be connected through a connection line for transmitting a flag signal indicating that a micom code is abnormal, the micom, if the check code is not recorded normally, may transmit the flag signal to a CPU through the connection line, and the CPU, if the flag signal is received, may recognize that the micom code is abnormal and restart updating the micom code.

The connection line for transmitting the flag signal may be connected through General Purpose I/O pins (GPIO).

The micom may check whether a check code is recorded normally in the check area at a time of rebooting a system and, if the check code is recorded normally, reboot the display apparatus normally.

The CPU may update the micom code using Universal Asynchronous Receiver Transmitter (UART) communication.

The CPU may receive the micom code from at least one of a broadcast medium, a network, an external storage medium, and a built-in storage medium.

A method for updating a micom code in a display apparatus which includes a micom storing a system code for driving a CPU and a CPU includes receiving a micom code by the CPU, updating a code installed in the micom using the received micom code by the CPU, and if an error occurs while the CPU updates the micom code, driving the CPU using the system code for driving a CPU by the micom.

The method may further include, if the CPU is operated using the system code for driving a CPU of the micom, restarting updating the micom code.

The micom may include a storage unit which stores the system code for driving a CPU.

The storage unit may include a boot code area which stores the system code for driving a CPU, a flash ROM area which records micom codes for operating a system, and a check area in which a check code indicating whether a code is normally recorded in the flash ROM area is recorded.

The driving the CPU may include checking whether a check code is recorded normally in the check area at a time of rebooting a system by the micom and driving a CPU using the system code for driving the CPU by the micom if the check code is not recorded normally, and may further include, if the CPU is operated using the system code for driving the CPU, restarting updating the micom code after deleting the check area and the flash ROM area.

The micom and the CPU may be connected through a connection line for transmitting a flag signal indicating that a micom code is abnormal, the driving the CPU may further include, if the check code is not recorded normally, transmitting the flag signal to the CPU through the connection line by the micom, and the restarting may include, if the flag signal is received, recognizing that the micom code is abnormal and restarting updating the micom code by the CPU.

The connection line for transmitting the flag signal may be connected through General Purpose I/O pins (GPIO).

The method may further include checking whether a check code is recorded normally in the check area at a time of rebooting a system by the micom and, if the check code is recorded normally, rebooting the display apparatus normally by the micom.

The CPU may update the micom code using Universal Asynchronous Receiver Transmitter (UART) communication.

The receiving may include receiving the micom code from at least one of a broadcast medium, a network, an external storage medium, and a built-in storage medium.

As described above, according to various exemplary embodiments, a display apparatus in which, if an error occurs while a CPU is updating a micom code, a micom drives the CPU using a system code and a method for updating a micom code thereof are provided. Accordingly, the display apparatus may be restored automatically without a jig apparatus even if an error occurs in the process of updating the micom code.

BRIEF DESCRIPTION OF THE DRAWINGS

The above and/or other aspects of the present disclosure will be more apparent by describing certain present disclosure with reference to the accompanying drawings, in which.

DETAILED DESCRIPTION

Figure 1:
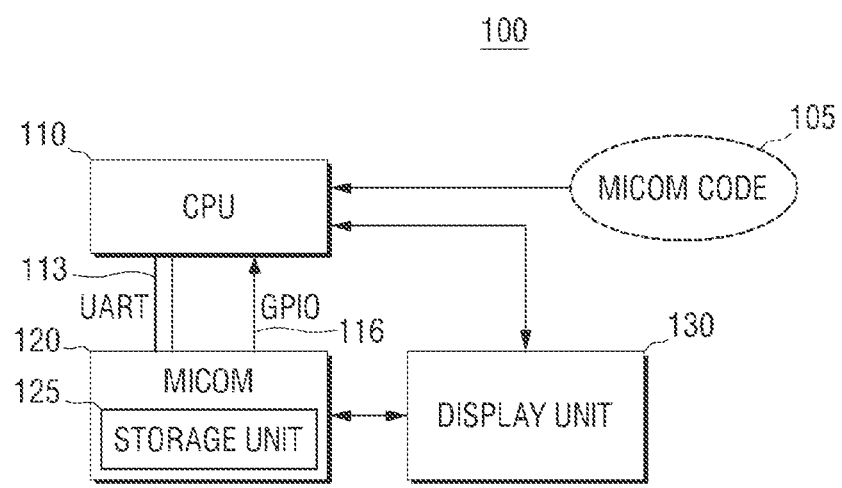
FIG. 1 is a block diagram illustrating configuration of a display apparatus according to an exemplary embodiment.

Certain exemplary embodiments are described in higher detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

FIG. 1 is a block diagram illustrating the configuration of a display apparatus 100 according to an exemplary embodiment. As illustrated in FIG. 1, the display apparatus 100 comprises a CPU 110, a micom 120, and a display unit 130.

The display unit 130 displays an image which is input under the control of the CPU 110 and the micom 120 on a screen.

The CPU 110 controls overall functions of the display apparatus 100.

Specifically, the CPU 110 receives a micom code 105 from outside and updates a code installed in the micom 120 using the received micom code. Herein, the micom code 105 represents a program or a firmware installed in the micom 120 to perform functions of a micom. The micom code 105 is installed and stored in the storage unit 125 which is built in the micom 120.

The CPU 110 may receive the micom code 105 through various ways. Specifically, the CPU 110 may receive the micom code 105 from at least one of a broadcast medium, a network, an external storage medium and a built-in storage medium. For example, the CPU 110 may receive the micom code 105 via internet or from a USB memory.

The micom 120 controls power of the display apparatus 100 and on/off of a system.

In addition, if an error occurs while the CPU 110 is updating a micom code, the micom 120 drives the CPU 110 using a system code. To do so, the micom 120 stores a system code for driving the CPU 110 in the storage unit 125 which is built in the micom 120. Herein, the system code for driving a CPU includes system codes for driving the CPU 110. In this case, the system code is recorded in a writing protection area where writing or deleting by the CPU 110 is prohibited.

Accordingly, even if an error occurs while a micom code is being updated and thus the micom 120 may not operate, the CPU 110 may operate using a system code stored in a separate area of the storage unit 125. The storage unit 125 may be embodied as a flash memory.

An error occurs while a micom code is being updated when a check code is not recorded in a check area 230. The check code will be explained later. An error occurs while a micom code is being updated when there is a power problem (such as power drop, power glitch, and so on), an AC power code connection problem, noise, or suspension of micom code reception (for example, a micom code is detached from a stored USB memory).

Figure 2:
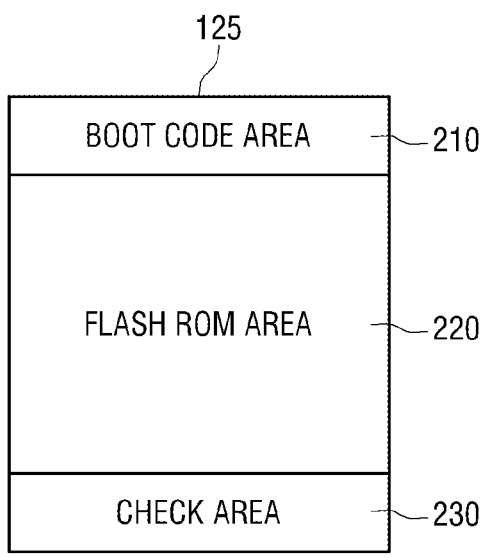
FIG. 2 is a view illustrating configuration of a storage unit of a micom in detail according to an exemplary embodiment.

The storage unit 125 which is built in the micom 120 will be explained in detail with reference to FIG. 2. FIG. 2 is a view illustrating the configuration of the storage unit 125 of the micom 120 in detail according to an exemplary embodiment.

As illustrated in FIG. 2, the storage unit 125 comprises a boot code area 210, a flash ROM area 220 and a check area 230.

The boot code area 210 stores codes required to boot the display apparatus 100. In addition, the boot code area 210 stores a system code for driving the CPU 110. In this case, the system code includes only the codes for driving the CPU 110. In addition, the boot code area 210 is designated as a writing protection area so as not to be changed by a CPU.

The flash ROM area 220 is an area where a micom code for operating a micom is installed and recorded.

The check area 230 is an area where a check code indicating whether a micom code is recorded normally in the flash ROM area 220 is recorded. That is, if a normal check code is recorded in the check area 230, a micom code is also recorded normally in the flash ROM area 220. On the other hand, if a check code is not recorded in the check area 230, the micom 120 recognizes that a micom code is not recorded normally in the flash ROM area 220 (that is, an error may occur in the process of updating the micom code).

The flash ROM area 220 and the check area 230 correspond to a writing area where recording or deleting may be performed under the control of the CPU 110.

The storage unit 125 has the above configuration. Therefore, even if a micom code is not recorded normally in the flash ROM area 220, the micom 120 may drive the CPU 110 using a system code stored in the boot code area 210.

Referring back to FIG. 1, if the CPU 110 operates using a system code due to an error, the CPU restarts a process of updating a micom code.

As illustrated in FIG. 1, the CPU 110 updates a micom code by communicating with the micom 120 through a Universal Asynchronous Receiver Transmitter (UART) communication line 113.

In addition, the CPU 110 and the micom 120 may have an additional connection line 116 for transmitting a flag signal. The connection line 116 is connected through General Purpose I/O (GPIO) pins. Herein, the flag signal is a signal indicating that a micom code recorded in the flash ROM area 220 is abnormal.

Accordingly, if a check code is not recorded normally, the micom 120 transmits a flag signal to the CPU 110 through the connection line 116. Subsequently, if the CPU 110 receives the flag signal, the CPU 110 recognizes that a micom code is abnormal and restarts updating of the micom code.

Hereinafter, a process where the CPU 110 and the micom 120 update a micom code will be explained in detail with reference to FIG. 3 and FIGS. 4A to 4F.

Figure 3:
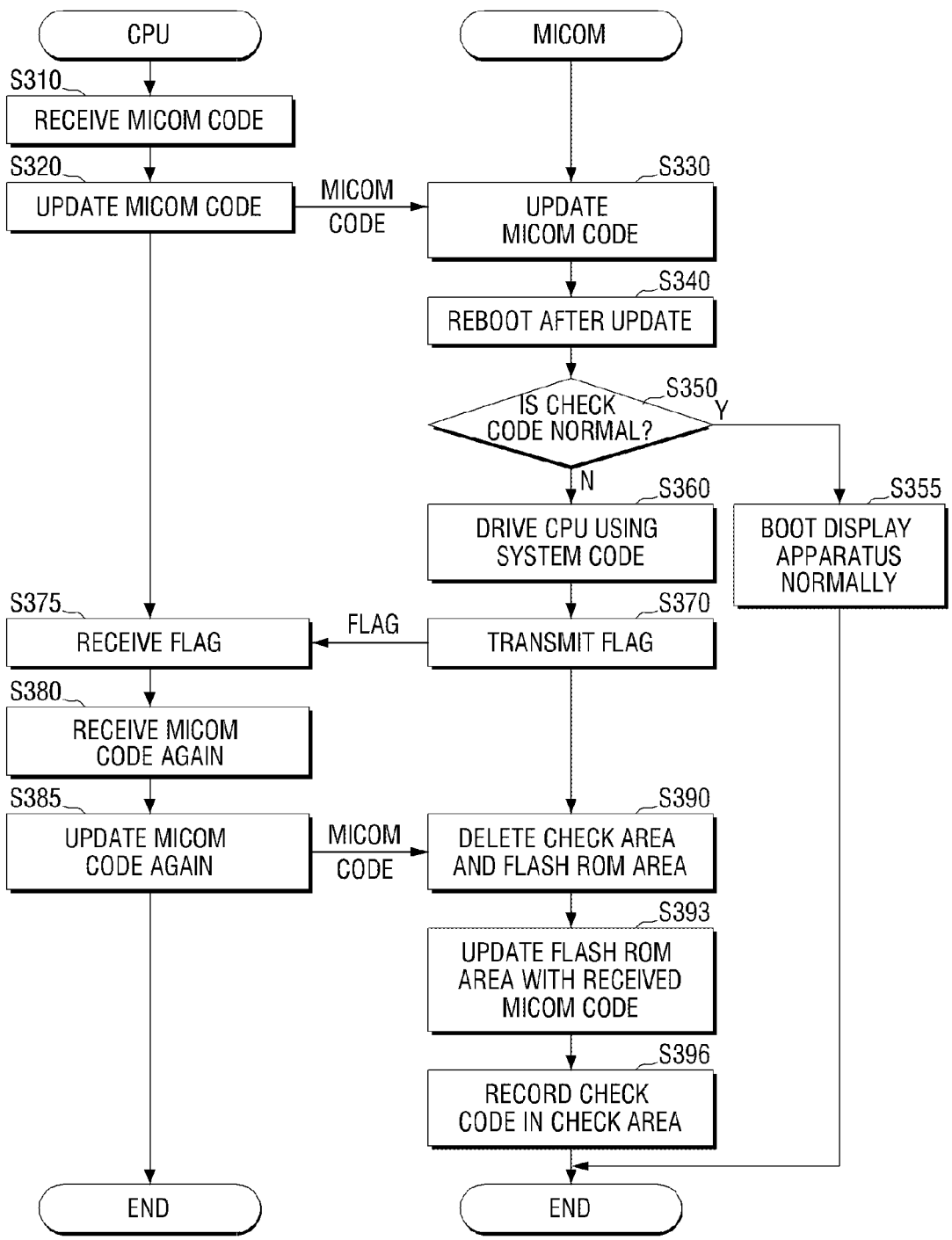
FIG. 3 is a flowchart to explain a method for updating a micom code of a display apparatus according to an exemplary embodiment.

FIG. 3 is a flowchart to explain a method for updating a micom code of the display apparatus 100 according to an exemplary embodiment.

FIGS. 4A to 4F are views illustrating a process of updating a micom code of the display apparatus 100 according to an exemplary embodiment.

The CPU 110 receives a micom code (S310). The CPU 110 updates a micom code of the micom 120 (S320). Subsequently, the micom 120 updates the micom code (S330).

Figure 4A:
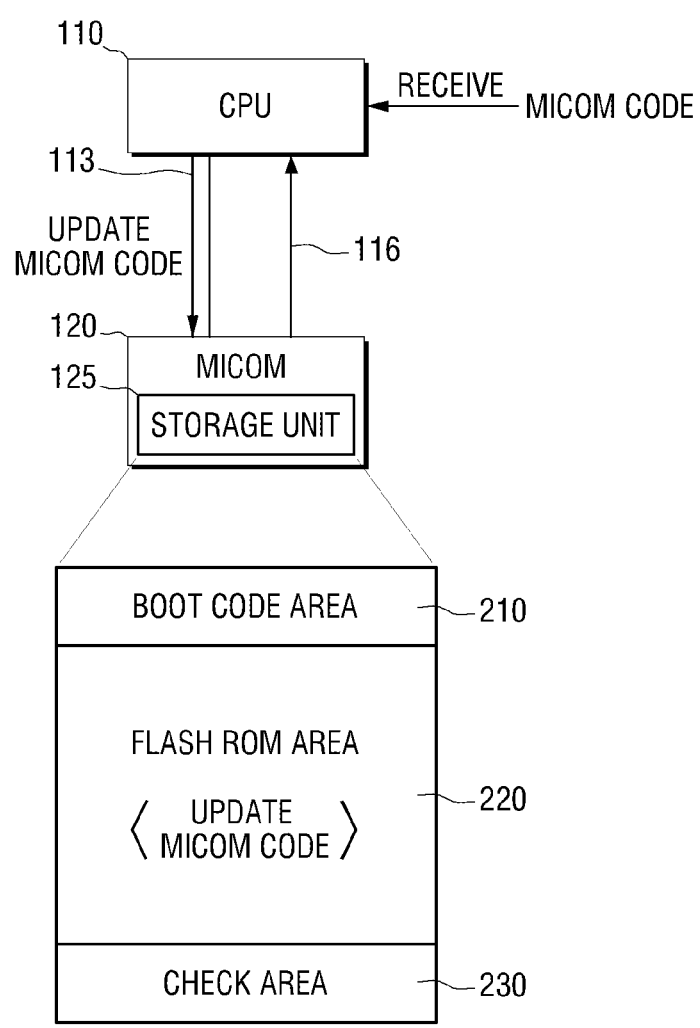
FIGS. 4A to 4F are views illustrating a process of updating a micom code of a display apparatus according to an exemplary embodiment.

Specifically, the micom 120 newly records a micom code received from the CPU 110 in the flash ROM area 220. FIG. 4A illustrates such updating state of the micom code.

FIG. 4A is a view illustrating that the CPU 110 updates a micom code of the micom 120. As illustrated in FIG. 4A, the CPU 110 receives a new micom code from outside. The CPU 110 updates a micom code of the micom 120 with the new micom code through the UART communication line 113.

Subsequently, the micom 120 updates a micom code in the flash ROM area 220 of the storage unit 125.

Referring back to FIG. 3, the micom 120 completes updating a micom code and reboots the display apparatus 100 to apply the updated micom code (S340).

In this case, if the micom code is updated normally, the micom 120 records a check code in the check area 230 normally after updating is completed. On the other hand, if an error occurs in the process of updating a micom code, the micom 120 may not record a check code in the check area 230 since updating is stopped abnormally.

Accordingly, the micom 120 determines whether a check code is recorded normally in the check area 230 at a time of booting in order to determine whether an error occurs in the process of updating a micom code (S350).

Figure 4B:
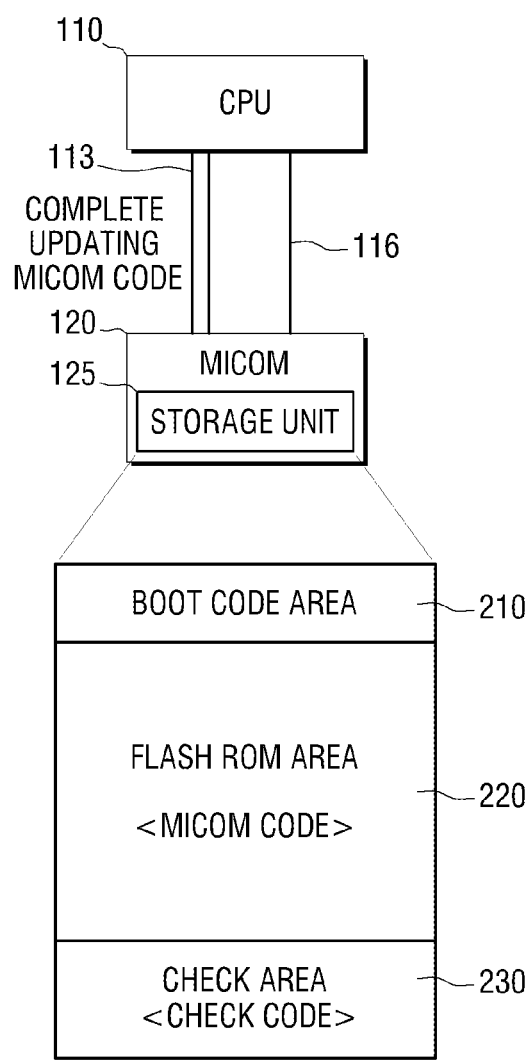

If a check code is recorded in the check area 230 normally (S350-Y), the micom 120 determines that a micom code has been updated normally without any error. Therefore, the micom 120 boots the display apparatus 100 normally (S355). FIG. 4B illustrates a case where a micom code has been updated normally.

FIG. 4B illustrates the storage unit 125 when a micom code has been updated normally according to an exemplary embodiment.

As illustrated in FIG. 4B, if a micom code has been updated normally, a micom code is recorded in the flash ROM area 220 normally. In addition, a check code is recorded in the check area 230 normally.

As such, if a micom code has been updated normally, it can be seen that a check code is recorded in the check area 230.

Referring back to FIG. 3, if a check code is not recorded in the check area 230 normally (that is, if an error occurs in the process of updating a micom code), the micom 110 drives the CPU 110 in a basic state using a system code of the boot code area 210 at a time of rebooting (S360). As such, even if a micom code is recorded abnormally due to an error occurred while updating a micom code, the boot code area 210 which is in a writing protection area is preserved. Thus, the micom 120 may drive the CPU 110 despite the error of the micom code.

In addition, the micom 120 transmits a flag signal to the CPU 110 through the GPIO connection line 116.

The CPU 110 receives a flag signal from the micom 120 (S375). Once the flag signal is received, the CPU 110 recognizes that a micom code is recorded abnormally (that is, an error may occur in the process of updating the micom code). Therefore, the CPU 110 receives a micom code again from outside (S380). The CPU 110 restarts updating using the received micom code (S385).

Subsequently, the micom 120 deletes the check area 230 and the flash ROM area 220. The micom 120 updates a flash ROM area with the received micom code (S393). After updating is completed normally, the micom 120 records a check code in the check area 230 (S396).

FIGS. 4C to 4F illustrate a case where the micom 120 updates a micom code when the micom 120 recognizes that a check code is not recorded in the check area 230.

Figure 4C:
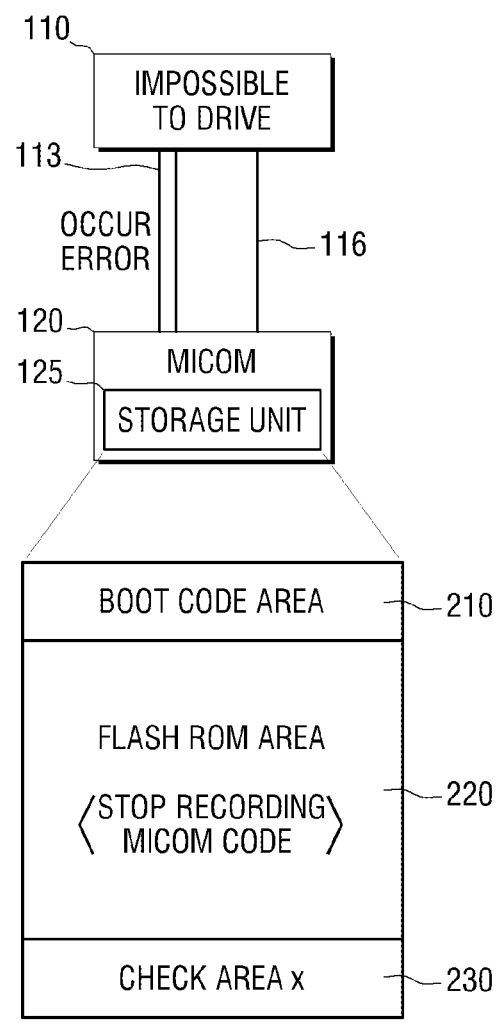

FIG. 4C illustrates a case where an error occurs while a micom code is being updated. As illustrated in FIG. 4C, if an error occurs while the CPU 110 updates a micom code, recording of the micom in the flash ROM area 220 is stopped. In addition, a check code is not recorded in the check area 230. In this case, the CPU 110 cannot operate as illustrated in FIG. 4C.

In this situation, the micom 120 restarts the CPU 110 using a system code for driving the CPU, which is stored in the boot code area 210. The micom 120 transmits a flag signal through the GPIO connection line 116.

Figure 4D:
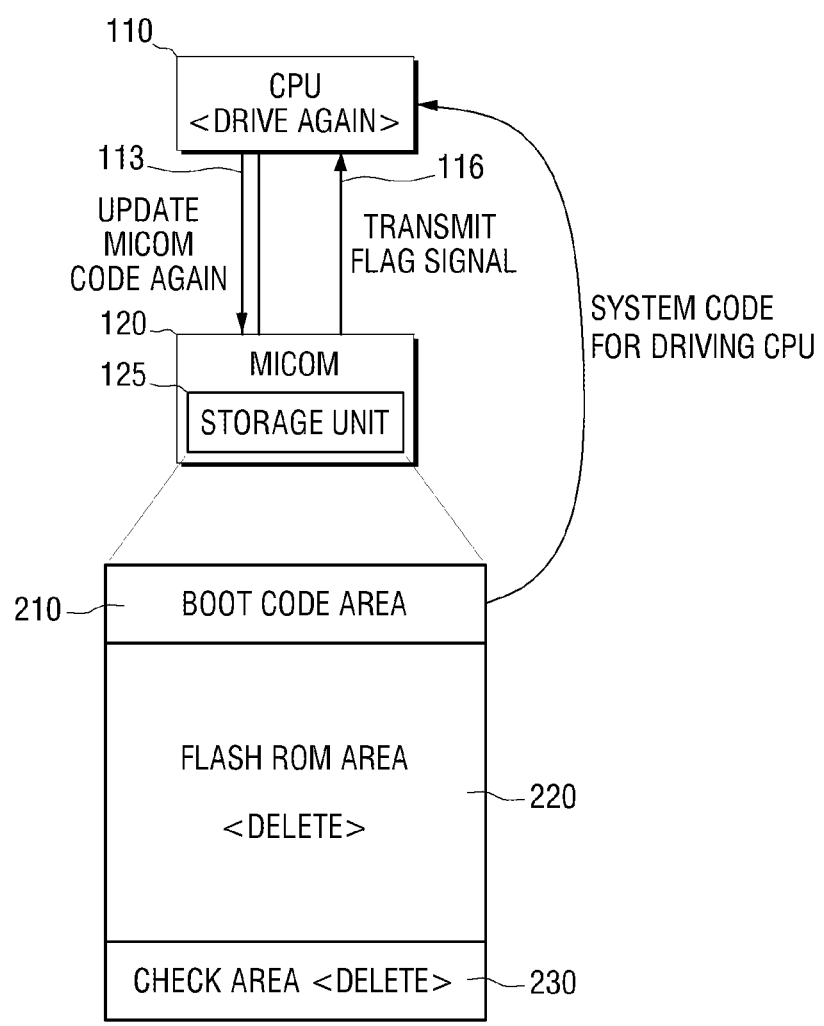

Subsequently, as illustrated in FIG. 4D, the CPU 110 recognizes that an error occurs in the process of updating a micom code and restarts updating of a micom code. Subsequently, the micom 120 deletes data recorded in the flash ROM area 220 and the check area 230.

Figure 4E:
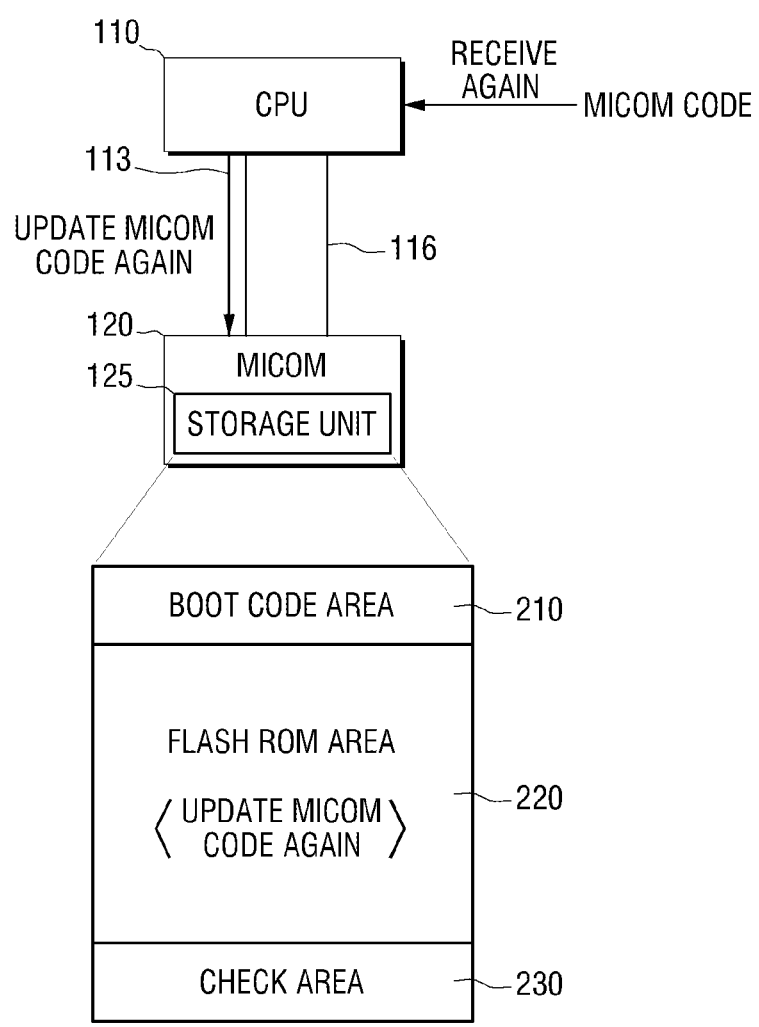

In addition, as illustrated in FIG. 4E, the CPU 110 receives a new micom code and updates a micom code again using the new micom code. Subsequently, the micom 120 updates the micom code in the flash ROM area 220.

Figure 4F:
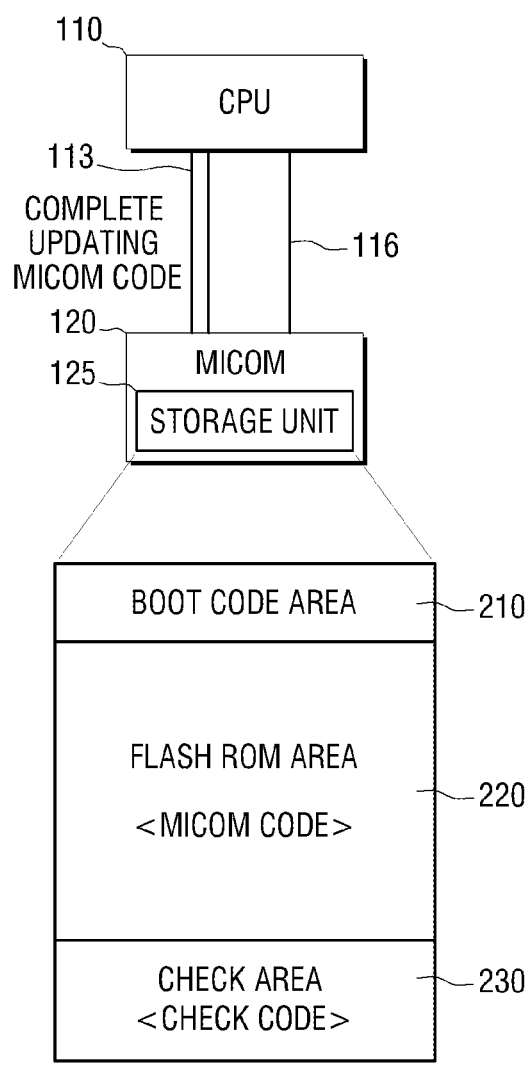

Afterwards, once updating of the new micom code is completed, the micom 120 records the micom code in the flash ROM area 220 normally, as illustrated in FIG. 4F. After recording of the micom code is completed, the micom 120 records a check code in the check area 230.

Through the above process, the display apparatus 100 may update a micom code again by driving a CPU automatically when an error occurs in the process of updating the micom code. Accordingly, a user may update a micom easily without an additional jig apparatus.

Meanwhile, in an exemplary embodiment, the display apparatus 100 may be any display apparatus which includes the CPU 110 and the micom 120. For example, the display apparatus 100 may be an LCD TV, a 3D TV, a monitor, a notebook computer, a PMP, and so on.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A display apparatus, comprising:
    a micom which stores a system code; and
    a Central Processing Unit (CPU) which receives a micom code and updates the micom code installed in the micom using the received micom code,
    wherein, if an error occurs while the CPU updates the micom code, the micom drives the CPU using the system code,
    wherein the micom comprises:
    a storage unit which stores the system code,
    wherein the storage unit comprises:
    a boot code area which stores the system code;

a flash ROM area which records micom codes for operating the display apparatus; and a check area in which a check code, indicating whether the micom code is normally recorded in the flash ROM area, is recorded, wherein the micom checks whether a check code is recorded normally in the check area at a time of rebooting the display apparatus and drives the CPU using the system code if the check code is not recorded normally, and wherein, if the CPU is operated using the system code, the CPU restarts updating the micom code after deleting the check area and the flash ROM area.

2. The display apparatus as claimed in claim 1, wherein, if the CPU is operated using the system code, the CPU restarts updating the micom code installed in the micom.

3. The display apparatus as claimed in claim 1, wherein the micom and the CPU are connected through a connection line for transmitting a flag signal indicating that the micom code is abnormal, wherein the micom, if the check code is not recorded normally, transmits the flag signal to the CPU through the connection line, wherein the CPU, if the flag signal is received, recognizes that the micom code is abnormal and restarts updating the micom code.

4. The display apparatus as claimed in claim 3, wherein the connection line for transmitting the flag signal is connected through General Purpose I/O pins (GPIO).

5. The display apparatus as claimed in claim 1, wherein the micom checks whether the check code is recorded normally in the check area at a time of rebooting the display apparatus and, if the check code is recorded normally, reboots the display apparatus normally.

6. The display apparatus as claimed in claim 1, wherein the CPU updates the micom code using Universal Asynchronous Receiver Transmitter (UART) communication.

7. The display apparatus as claimed in claim 1, wherein the CPU receives the micom code from at least one of a broadcast medium, a network, an external storage medium, and a built-in storage medium.

8. The display apparatus as claimed in claim 1, further comprising:

a display unit which displays an image which is input under the control of the CPU and the micom on a screen.

9. A method for updating a micom code in a display apparatus which includes a micom storing a system code and a CPU, the method comprising:

receiving a micom code by the CPU;

updating the micom code installed in the micom using the received micom code by the CPU; and if an error occurs while the CPU updates the micom code, driving the CPU using the system code from the micom, wherein the micom comprises:

a storage unit which stores the system code for driving the CPU, wherein the storage unit comprises:

a boot code area which stores the system code for driving CPU;

a flash ROM area which records micom codes for operating the display apparatus; and a check area in which a check code indicating whether the micom code is normally recorded in the flash ROM area is recorded, wherein the driving the CPU comprises:

checking whether a check code is recorded normally in the check area at a time of rebooting the system by the micom; and driving the CPU using the system code by the micom if the check code is not recorded normally, wherein driving the CPU further comprises:

if the CPU is operated using the system code, restarting updating the micom code after deleting the check area and the flash ROM area.

10. The method as claimed in claim 9, wherein, if the CPU is operated using the system code of the micom, restarting updating the micom code installed in the micom.

11. The method as claimed in claim 9, wherein the micom and the CPU are connected through a connection line for transmitting a flag signal indicating that a micom code is abnormal, wherein the driving the CPU further comprises, if the check code is not recorded normally, transmitting the flag signal to a CPU through the connection line by the micom, wherein the restarting the updating comprises, if the flag signal is received, recognizing that the micom code is abnormal and restarting the updating the micom code by the CPU.

12. The method as claimed in claim 11, wherein the connection line for transmitting the flag signal is connected through General Purpose I/O pins (GPIO).

13. The method as claimed in claim 9, further comprising:

checking whether a check code is recorded normally in the check area at a time of rebooting the display apparatus by the micom; and if the check code is recorded normally, rebooting the display apparatus normally by the micom.

14. The method as claimed in claim 9, wherein the CPU updates the micom code using Universal Asynchronous Receiver Transmitter (UART) communication.

15. The method as claimed in claim 9, wherein the receiving of the micom code comprises receiving the micom code from at least one of a broadcast medium, a network, an external storage medium, and a built-in storage medium.

16. A system which updates a micom code, the system comprising:

a micom which stores a micom code and a system code; and a Central Processing Unit (CPU) which receives another micom code and updates the micom code installed in the micom using the received other micom code, wherein, if an error occurs while the CPU updates the micom code installed in the micom with the received other micom code, the micom drives the CPU using the system code stored in the micom wherein the micom comprises:

a storage unit which stores the system code for driving the CPU, wherein the storage unit comprises:

a boot code area which stores the system code for driving a CPU;

a flash ROM area which records micom codes for operating the display apparatus; and a check area in which a check code indicating whether the micom code is normally recorded in the flash ROM area is recorded, wherein the driving the CPU comprises:

checking whether a check code is recorded normally in the check area at a time of rebooting the system by the micom; and driving the CPU using the system code by the micom if the check code is not recorded normally, wherein driving the CPU further comprises:

if the CPU is operated using the system code, restarting updating the micom code after deleting the check area and the flash ROM area.

17. The system as claimed in claim 16, further comprising:

a display unit which displays an image which is input under the control of the CPU and the micom on a screen.

* * * * *